July 23, 1935. H. STEINER 2,008,844
PISTON ROD FOR LIQUID COOLED PISTONS
Filed May 8, 1933
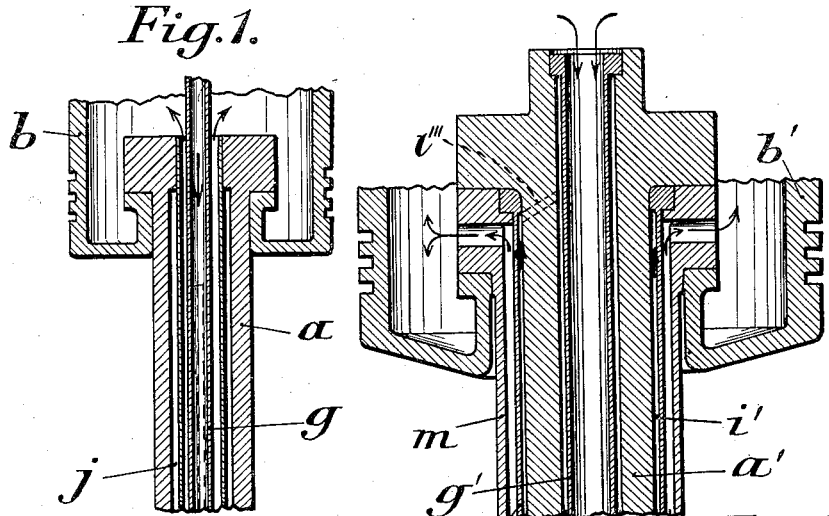
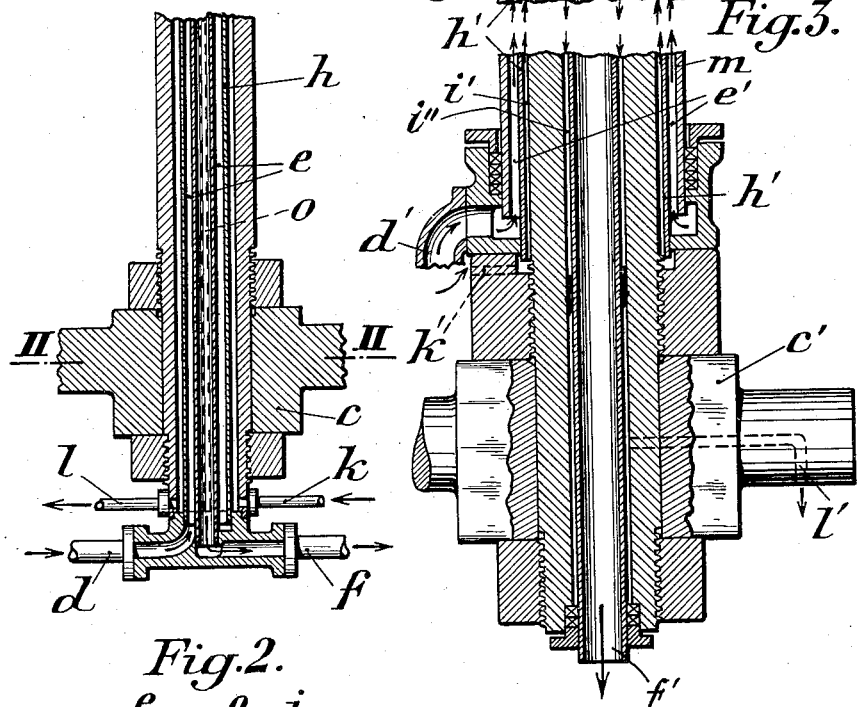
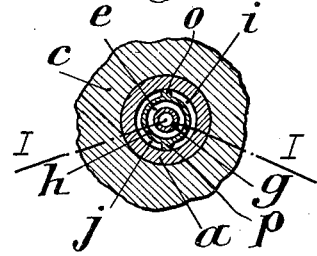
INVENTOR:
Hans Steiner
BY
Pennie Davis Marvin + Edmonds
ATTORNEY.

Patented July 23, 1935

2,008,844

UNITED STATES PATENT OFFICE 2,008,844

PISTON ROD FOR LIQUID-COOLED PISTONS

Hans Steiner, Winterthur, Switzerland, assignor to the firm Sulzer Frères Société Anonyme, Winterthur, Switzerland Application May 8, 1933, Serial No. 669,856 In Switzerland August 20, 1932

5 Claims. (Cl. 123—176)

This invention relates to piston rods for liquid-cooled pistons or the like and refers particularly though not exclusively to piston rods for internal combustion engines of the double-acting type. The type of piston rod to which the invention relates is furnished with concentric passages forming a water conduit through which cooling water is circulated to and from the interior of the piston.

Piston rods for liquid cooled pistons, as heretofore constructed, have certain disadvantages. In one previous construction, a single tube for cooling liquid was placed within the piston rod, the outer walls of this tube being in spaced relation to the inner walls of the piston rod. The cooling liquid was delivered to the interior of the piston through the tube, and after cooling the piston, flowed out through the annular space between the outside of the tube and the walls of the hollow piston rod. As the cooling liquid is usually water, such a construction is undesirable because the walls of the hollow piston rod quickly corrode, and the incrustation interferes with the effective transference of heat between the piston rod itself and the cooling liquid.

In another form of liquid cooled piston rod, as heretofore constructed, two concentric liquid conduits were employed in place of one, but the walls of the outer of these two conduits were placed in contact with the inner walls of the hollow piston rod. It was found difficult, if not impossible, to place and keep these surfaces in sufficiently close contact to avoid interference with the transmission of heat between the piston rod and the cooling liquid. One of the factors which interfered with the desired close contact was the relative movement between the surface of the outer cooling tube and the walls of the piston rod caused by different rates of expansion of these two elements.

Accordingly, the principal object of the present invention is to provide a piston rod for liquid cooled pistons which is so constructed as to provide an effective transfer of heat from the piston rod itself to the cooling medium.

Another object of the invention is to effectively prevent the corrosion of the piston rod.

To this end, according to the invention, a space is provided between the water conduit and the walls of the piston rod, and this space is filled with non-corrosive liquid.

If, for example, two tubes preferably concentric are provided within the piston rod through which cooling water is caused to flow respectively to and from the interior of the piston, one or more longitudinal passages are provided between the outer water tube and the inner wall of the piston rod and are adapted to contain liquid such, for example, as oil. Or the piston rod may comprise a tube forming a conduit within the piston rod, and concentric tubes forming an annular conduit surrounding the piston rod, through which conduits cooling medium is caused to flow to and from the piston, the inner wall of the outer annular conduit being spaced apart from the outer wall of the piston rod so as to form one or more longitudinal passages between these walls adapted to contain a liquid such, for example, as oil.

Two constructions, each embodying the invention, as applied to piston rods for double-acting internal combustion engines, are illustrated by way of example, in the accompanying drawing, in which Figure 1 is a longitudinal cross-section of one construction, taken on the line I—I of Figure 2, Figure 2 is a transverse cross-section taken on the line II—II of Figure 1, and Figure 3 is a longitudinal cross-section of another construction shown on a larger scale than that of Figure 1.

In the construction illustrated in Figures 1 and 2 the piston rod $a$ of the double-acting water-cooled piston $b$ is internally bored as shown and furnished with a crosshead $c$. The cooling water is supplied to the interior of the piston $b$ from a supply pipe $d$ through an annular passage $e$, the cooling water being discharged from the interior of the piston to a discharge pipe $f$ through a central passage $g$. The outer wall of the annular passage $e$ is constituted by a tube $h$ so constructed that passages $i$ and $j$, separated from each other by means of ribs $o$ and $p$ (Figure 2) are formed between the tube $h$ and the inner surface of the piston rod $a$. Oil, or other suitable liquid which will not tend to cause corrosion, is circulated through the passages $i$ and $j$ and a passage between the same (not shown) at the inner end of the piston rod, from an oil inlet pipe $k$ to an outlet pipe $l$.

Instead of the tube $h$ being in the form of a liner in contact with the inner surface of the piston rod $a$ and thus tending to affect undesirably the transference of heat between the cooling water and the piston rod $a$, the oil within the passages $i$ tends to overcome the above difficulty and ensures effective transference of heat between the cooling water and the piston rod. The oil may either be caused to circulate through the passages $i$ as above described or may be simply contained therein.

In the construction illustrated in Figure 3 a longitudinal annular passage $i''$ is provided between a central tube or water conduit $g'$ and the piston rod $a'$ which is surrounded by a tube $h'$ spaced apart from the outer surface of the piston rod $a'$ so as to form an outer longitudinal annular passage $i'$. An outer tubular casing $m$ surrounds the tube $h'$ so that an annular conduit $e'$ is formed between these parts. Cooling water fed through a supply pipe $d'$ flows through the annular conduit $e'$ to the interior of the piston $b'$ from which the cooling water returns through the interior of the central tube or conduit $g'$ as indicated by the arrows. Oil is fed from an inlet conduit $k'$ through the outer longitudinal passage $i'$ between the tube $h'$ and the outer surface of the piston rod $a'$ and thence through the passage $i'''$ to the longitudinal passage $i''$ between the central conduit $g'$ and the interior of the piston rod $a'$, this oil being discharged through the discharge conduit $l'$. In this construction effective transference of heat between the cooling water and the piston rod is ensured not only from the interior of the piston rod through the inner layer of oil but also between the cooling water in the annular conduit $e'$ through the oil layer surrounding the outer surface of the piston rod $a'$.

It is to be understood that the above is an exemplifying disclosure. Various changes may be made in the construction within the scope of the appended claims, without departing from the spirit of the invention.

I claim:

1. In a piston rod for liquid-cooled pistons the combination with the rod of concentric water conduits adapted to lead a cooling medium to and from the interior of the piston, a space, not in communication with the water conduits, adapted to be filled with a liquid other than water being provided between one wall of the water conduit and the wall of the piston rod.

2. In a piston rod for liquid-cooled pistons the combination with the rod of two concentric tubes adapted to lead a cooling medium to and from the interior of the piston, a space, not in communication with the water conduits adapted to be filled with a liquid other than water being provided between the wall of one concentric tube and the wall of the piston rod.

3. In a piston rod for liquid-cooled pistons the combination with the rod of a concentric tube forming a conduit within the piston rod, of concentric tubes forming an annular conduit surrounding the piston rod, through which conduits cooling medium may be caused to flow to and from the piston, the inner wall of the outer annular conduit being spaced apart from the outer wall of the piston rod so as to form a space between these walls adapted to contain a cooling liquid.

4. In a piston rod as claimed in claim 3, in which the tube within the piston rod is also spaced apart from the latter so as to form a further space between the outer wall of this inner water conduit and the inner wall of the piston rod adapted to contain a cooling liquid.

5. A water-cooled piston rod, particularly for double acting internal combustion engines, wherein the cooling water avoids direct contact with the piston rod and flows and returns through two spaced telescoped tubes positioned within the rod and having between the exterior cooling water tube and the wall of the piston rod, a space containing a non-corrosive liquid, whereby the non-corrosive liquid produces a liquid contact increasing the transmission of heat between the piston rod and the cooling water pipe.

HANS STEINER.